(12) United States Patent
Chai et al.

(10) Patent No.: US 9,840,428 B2
(45) Date of Patent: Dec. 12, 2017

(54) SYSTEM FOR TREATING AND RECYCLING RAINWATER

(71) Applicants: Chongqing University, Chongqing (CN); Shenzhen Yuezhong (Group) Co., Ltd., Shenzhen (CN)

(72) Inventors: Hongxiang Chai, Chongqing (CN); Songming Tan, Chongqing (CN); Yuming Zhou, Chongqing (CN); Qiang Jiang, Chongqing (CN); Shen Li, Chongqing (CN); Luwei Guo, Chongqing (CN); Wei Kang, Chongqing (CN); Lei Kong, Chongqing (CN)

(73) Assignees: CHONGQING UNIVERSITY, Chongqing (CN); SHENZHEN YUEZHONG (GROUP) CO., LTD., Shenzhen (CN)

( * ) Notice: Subject to any disclaimer, the term of this patent is extended or adjusted under 35 U.S.C. 154(b) by 281 days.

(21) Appl. No.: 14/565,409

(22) Filed: Dec. 9, 2014

(65) Prior Publication Data
US 2016/0017588 A1    Jan. 21, 2016

(30) Foreign Application Priority Data
Jul. 15, 2014   (CN) .......................... 2014 1 0335020

(51) Int. Cl.
*B01D 33/70*   (2006.01)
*C02F 1/00*    (2006.01)
(Continued)

(52) U.S. Cl.
CPC ................ *C02F 3/327* (2013.01); *E03B 3/02* (2013.01); *C02F 2103/001* (2013.01); *C02F 2203/006* (2013.01); *Y02W 10/18* (2015.05)

(58) Field of Classification Search
CPC .. C02F 3/327; C02F 3/32; C02F 3/103; C02F 2203/006; C02F 2103/001; E03B 3/02; E03F 1/002; Y02W 10/18
(Continued)

(56) References Cited

U.S. PATENT DOCUMENTS 6,159,371 A * 12/2000 Dufay ..................... C02F 3/327
                                              210/150
6,755,972 B1 *  6/2004 Kouloumbis ........... C02F 3/327
                                              210/602
(Continued)

*Primary Examiner* — Nam Nguyen
*Assistant Examiner* — Julia Wun
(74) *Attorney, Agent, or Firm* — Matthias Scholl, PC; Matthias Scholl

(57) ABSTRACT

A system for treating and recycling rainwater, including at least three stages constructed wetlands disposed along a sloped surface. Each stage constructed wetland includes a coarse gravel layer, a fine gravel layer, an improved soil layer, and wetland plants from bottom to top. Slopes are disposed at two sides of the upper part of each constructed wetland and are different in heights. An intermediate overflow pipe is disposed at the top of the slope between every two adjacent constructed wetlands. A last overflow pipe communicates with a municipal rainwater pipe. The coarse gravel layers of every two adjacent constructed wetlands are connected by connecting pipes. A perforated water collecting pipe is disposed at front ends of the connecting pipes. A water outlet pipe is disposed in the bottom of the coarse gravel layer of a last stage constructed wetland and is connected to a clean water reservoir.

2 Claims, 1 Drawing Sheet

(51) Int. Cl.
*C02F 3/32* (2006.01)
*E03B 3/02* (2006.01)
*C02F 103/00* (2006.01)

(58) Field of Classification Search
USPC ....... 210/150, 151, 170.08, 602, 747.2, 767, 210/170.03, 542, 800, 513, 790, 804, 806, 210/807, 805
See application file for complete search history.

(56) References Cited

U.S. PATENT DOCUMENTS

| | | | |
|---|---|---|---|
| 6,896,805 B2* | 5/2005 | Austin | C02F 3/302 210/150 |
| 7,320,752 B2* | 1/2008 | Austin | C02F 3/06 210/170.01 |
| 7,967,979 B2* | 6/2011 | Grewal | C02F 3/306 210/150 |
| 8,303,816 B2* | 11/2012 | Kent | C02F 3/10 210/170.03 |
| 2012/0152827 A1* | 6/2012 | Allard | C02F 3/327 210/602 |

* cited by examiner

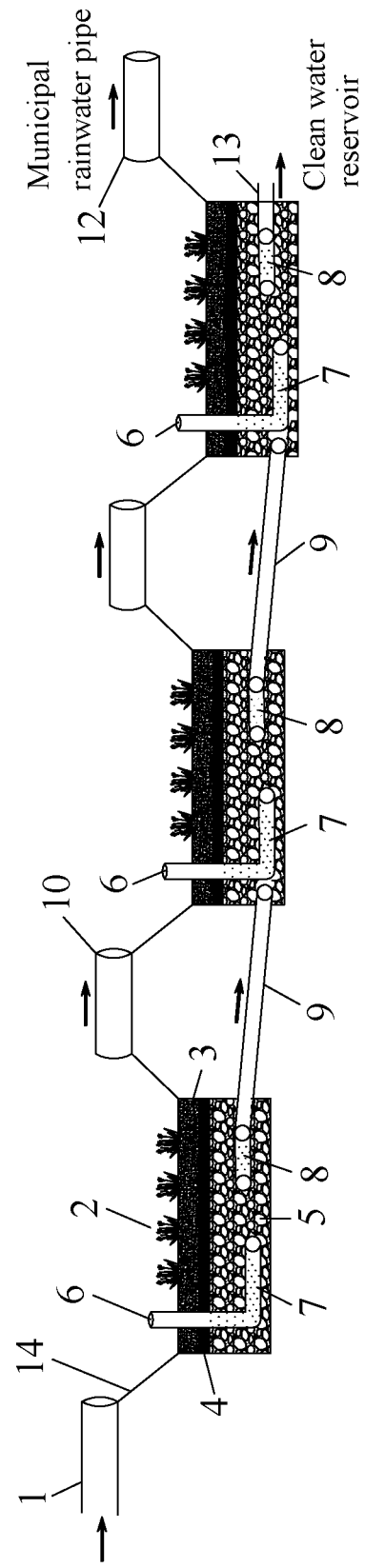

SYSTEM FOR TREATING AND RECYCLING RAINWATER

CROSS-REFERENCE TO RELATED APPLICATIONS

Pursuant to 35 U.S.C. §119 and the Paris Convention Treaty, this application claims the benefit of Chinese Patent Application No. 201410335020.4 filed Jul. 15, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to the field of rainwater treatment and recycling, and more particularly to a system for treating and recycling rainwater.

Description of the Related Art

Conventional systems for treating and recycling rainwater do not utilize the slope of the natural terrain. They are inefficient and do not solve the problem of waterlogging.

SUMMARY OF THE INVENTION

In view of the above-described problems, it is one objective of the invention to provide a system for treating and recycling rainwater that aims to solve the low utilization of the rainwater resource and serious waterlogging in the present urban building area and that utilizes the slope of the natural terrain to construct the water collecting and purifying facilities, thereby being capable of purifying rainwater, delaying and attenuating the runoff peak, and recycling the rainwater.

To achieve the above objective, in accordance with one embodiment of the invention, there is provided a system for treating and recycling rainwater. The system comprises: at least three stages constructed wetlands, slopes, intermediate overflow pipes, a last overflow pipe, connecting pipes, perforated water collecting pipes, and a water outlet pipe. Each stage constructed wetland comprises a coarse gravel layer, a fine gravel layer, an improved soil layer, and wetland plants from bottom to top. The at least three stages constructed wetlands are disposed along a sloped surface. The slopes are disposed at two sides of an upper part of each constructed wetland and are different in heights. Each of the intermediate overflow pipes is disposed at a top part of the slope between every two adjacent constructed wetlands. The last overflow pipe communicates with a municipal rainwater pipe. The coarse gravel layers of every two adjacent constructed wetlands are connected by the connecting pipes. The perforated water collecting pipes are disposed at front ends of the connecting pipes. The water outlet pipe is disposed in a bottom part of the coarse gravel layer of a last stage constructed wetland and is connected to a clean water reservoir.

The rainwater on the sloped surface enters the constructed wetland. In case of small rainfall intensity, the rainwater accommodated by the constructed wetlands is totally purified before it enters the clean water reservoir; and in case of strong rainfall intensity, one part of rainwater after purification enters the clean water reservoir, the other part of the rainwater is connected to the municipal rainwater pipe network via the last overflow pipe of the last stage constructed wetland.

Advantages according to embodiments of the invention are summarized as follows: the natural terrain of the building area of the mountain city is utilized, rainwater purification is conducted in the garden of the building area, and the purified rainwater is delivered to the clean water reservoir for reuse, so that the water resource is fully utilized, the rainwater runoff is delayed or attenuated, and the water pollution is decreased.

BRIEF DESCRIPTION OF THE DRAWINGS

The invention is described hereinbelow with reference to accompanying drawings, in which the sole figure is a structure diagram of a system for treating and recycling rainwater in accordance with one embodiment of the invention.

In the drawing, the following reference numbers are used: 1. Water inlet pipe; 2. Wetland plants; 3. Improved soil layer; 4. First gravel layer; 5. Second gravel layer; 6. Perforated vertical pipe for water distribution; 7. Perforated horizontal pipe for water distribution; 8. Perforated water collecting pipe; 9. Collecting pipe; 10. Intermediate overflow pipe; 12. Last stage overflow pipe; 13. Water outlet pipe; and 14. Slope.

DETAILED DESCRIPTION OF THE EMBODIMENTS

For further illustrating the invention, experiments detailing a system for treating and recycling rainwater are described below. It should be noted that the following examples are intended to describe and not to limit the invention.

Taken a three-stage constructed wetland as an example, as shown in the sole figure, two sides of an upper part of each constructed wetland are provided with slopes 14 of different heights. A coarse gravel layer 5, a fine gravel layer 4, an improved soil layer 3, and wetland plants 2 are disposed from bottom to top in each constructed wetland. An intermediate overflow pipe 10 is disposed on a top of the slope between every two adjacent constructed wetlands. A last overflow pipe 12 is connected to a municipal rainwater pipe. The coarse gravel layers 5 of every two adjacent constructed wetlands are connected by connecting pipes 9. A perforated water collecting pipe 8 is distributed in a front end of the connecting pipe 9. A water outlet pipe 13 is disposed in the coarse gravel layer 5 in a bottom of the last stage constructed wetland for communicating with a clean water reservoir.

As shown in the drawing, a perforated vertical pipe 6 for water distribution is disposed in the constructed wetland. The perforated vertical pipe 6 is extended from the improved soil layer for between 25 and 30 cm. A part of the perforated vertical pipe 6 disposed inside the coarse gravel layer 5 is provided with through holes. A bottom part of the perforated vertical pipe 6 communicates with a perforated horizontal pipe 7 for water distribution.

Runoff formed by rainwater at different underlying surfaces enters the constructed wetland via the water inlet pipe 1. In case of relatively small rainfall intensity, the infiltration velocity of the rainwater is larger than the water collecting velocity of the constructed wetland, so that no rainwater overflows from the constructed wetland. The rainwater runoff is successively treated by the three-stage constructed wetland (under cooperative actions of the plant, the filling layers, and the microbes) where rainwater is purified, and thereafter the rainwater is totally accumulated by the clean water reservoir for reuse, so that no burden on the municipal rainwater pipe network is resulted. In case of strong rainfall intensity, the rainwater infiltration velocity is smaller than the water collecting velocity of the constructed wetland, so that the rainwater level is higher than a top of the perforated vertical pipe 6. One part of the rainwater directly enters the perforated vertical pipe 6 and the perforated horizontal pipe 7 where water is distributed, after that the rainwater enters the coarse gravel layer 5 for purification and then enters a next stage constructed wetland. Another part of the rainwater is successively treated by the improved soil layer 3, the fine gravel layer 4, and the coarse gravel layer 5 and enters the coarse gravel layer of the next stage constructed wetland for purification and finally flows out of the last stage constructed wetland and is accumulated in the clean water reservoir. And still another part of the rainwater enters the next stage constructed wetland via the intermediate overflow pipe 10 for treatment. Water overflowing from the last stage constructed wetland is connected to the municipal rainwater pipe network via the last overflow pipe 12. Thus, through the treatment of the constructed wetland, the pollutants load in the rainwater runoff is decreased, the flood peak is delayed, and the peak flow is largely decreased, thereby largely attenuating the burden on the municipal rainwater pipe network and decreasing the potential danger of the waterlogging.

A ratio between slope coefficients (a ratio of a slope height to a slope width) of the two sides of the upper part of the constructed wetland is no larger than 1:3. A water inlet slope 14 of the constructed wetland is made of pebbles in order to prevent the feeding water from brushing the grass and soil of the slope. A depth of the water stored by the constructed gravel wetland is no larger than 30 cm. When the depth of the stored water is larger than 30 cm, the rainwater overflows to the next stage constructed wetland or the municipal rainwater pipe network via the overflow pipe.

The filling layers of the constructed wetland include the improved soil layer 3, the fine gravel layer 4, and the coarse gravel layer 5. Different filling layers are separated by permeable geotextiles. An anti-seepage geomembrane is disposed at a bottom part of the coarse gravel layer 5. The improved soil layer 3 has a thickness of no less than 10 cm and a permeability coefficient of no less than $1\times10^{-5}$ m/s and is planted with wetland plants 2 (such as cattails and cannas). The fine gravel layer 4 has a thickness of no less than 10 cm and a permeability coefficient of no less than $1\times10^{-4}$ m/s. The coarse gravel layer 5 has a thickness of no less than 20 cm, and the gravels are uniformly distributed and have a grain size of approximately 20 mm.

The occupied area, i. e., the water holding area, of the system for treating and recycling rainwater is determined by complete water balance method in accordance with the permeability capacity, the influence of the plants of the water storing layer, and the void storage capacity.

The system in the example for treating and recycling rainwater of the invention is described based on a three-stage constructed wetland, and more than three stages constructed wetlands can also be practicable.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for treating and recycling rainwater, the system comprising:
   a) at least three constructed wetlands, each of the at least three constructed wetlands comprising a coarse gravel layer, a fine gravel layer, a soil layer, wetland plants, a first slope, and a second slope; the soil layer comprising a top, a first side, and a second side; the first slope comprising a first top; the second slope comprising a second top; and the coarse gravel layer, the fine gravel layer, the soil layer, and the wetland plants being consecutively arranged from bottom to top;
   b) intermediate overflow pipes; each of the intermediate overflow pipes comprising a water inlet and a water outlet;
   c) a last overflow pipe;
   d) connecting pipes;
   e) perforated water collecting pipes;
   f) a water outlet pipe;
   g) a perforated vertical pipe comprising a plurality of through holes; and
   h) a perforated horizontal pipe comprising a water outlet; wherein:
   the at least three constructed wetlands are disposed along a sloped surface;
   the first side is opposite to the second side;
   the first slope is connected to the first side;
   the second slope is connected to the second side;
   the first slope and the top of the soil layer form a first obtuse angle;
   the top of the soil layer and the second slope form a second obtuse angle;
   the first slope is disposed upstream of the second slope; the first top of the first slope is higher than the second top of the second slope; the second top of the second slope is higher than the top of the soil layer;
   each of the intermediate overflow pipes is disposed between every two adjacent constructed wetlands of the at least three constructed wetlands;
   the water inlet of each of the intermediate overflow pipes is connected to the second top of the second slope of an upstream constructed wetland of the at least three constructed wetlands; the water outlet of each of the intermediate overflow pipes is connected to the first top of the first slope of a downstream constructed wetland of the at least three constructed wetlands;
   the last overflow pipe communicates with a municipal rainwater pipe;
   the coarse gravel layers of every two adjacent constructed wetlands of the at least three constructed wetlands are connected by the connecting pipes;
   the perforated water collecting pipes are disposed at front ends of the connecting pipes;
   the water outlet pipe is disposed in a bottom part of the coarse gravel layer of a last constructed wetland of the at least three constructed wetlands and is connected to a clean water reservoir;
   the perforated vertical pipe and the perforated horizontal pipe are both disposed in each of the at least three constructed wetlands;
   the perforated vertical pipe is extended from the soil layer for between 25 and 30 cm;
   the plurality of through holes is located inside the coarse gravel layer;
   a bottom part of the perforated vertical pipe communicates with the perforated horizontal pipe; and the water outlet of the perforated horizontal pipe is connected to the coarse gravel layer for transporting the rainwater from the perforated horizontal pipe to the coarse gravel layer.

2. The system of claim 1, wherein an anti-seepage geomembrane is disposed at a bottom part of the coarse gravel layer; the soil layer has a thickness of no less than 10 cm and a permeability coefficient of no less than $1\times10^{-5}$ m/s and is planted with the wetland plants; the fine gravel layer has a thickness of no less than 10 cm and a permeability coefficient of no less than $1\times10^{-4}$ m/s; the coarse gravel layer has a thickness of no less than 20 cm, and gravels are uniformly distributed and have a grain size of approximately 20 mm.

* * * * *